(12) United States Patent
Harter

(10) Patent No.: US 9,613,193 B1
(45) Date of Patent: Apr. 4, 2017

(54) MECHANISM FOR LOCKING A COMPUTER DISPLAY AND FOR UNLOCKING THE DISPLAY WHEN PURPOSELY USED

(75) Inventor: Ronald Harter, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 122 days.

(21) Appl. No.: 13/157,070

(22) Filed: Jun. 9, 2011

Related U.S. Application Data

(60) Provisional application No. 61/352,880, filed on Jun. 9, 2010.

(51) Int. Cl.
*G06F 21/31* (2013.01)
*H04W 12/08* (2009.01)
*H04W 12/06* (2009.01)

(52) U.S. Cl.
CPC ............. *G06F 21/31* (2013.01); *H04W 12/06* (2013.01); *H04W 12/08* (2013.01)

(58) Field of Classification Search
None
See application file for complete search history.

(56) References Cited

U.S. PATENT DOCUMENTS

| | | | | |
|---|---|---|---|---|
| 6,874,094 | B2 * | 3/2005 | Parker | 713/310 |
| 7,657,849 | B2 | 2/2010 | Chaudhri et al. | |
| 2005/0017957 | A1 * | 1/2005 | Yi | 345/173 |
| 2005/0193144 | A1 * | 9/2005 | Hassan | G06F 21/31 709/238 |
| 2007/0150842 | A1 * | 6/2007 | Chaudhri et al. | 715/863 |
| 2007/0229465 | A1 * | 10/2007 | Sakai et al. | 345/173 |
| 2008/0168290 | A1 * | 7/2008 | Jobs et al. | 713/324 |
| 2008/0310602 | A1 * | 12/2008 | Bhupati | 379/88.12 |
| 2009/0058823 | A1 * | 3/2009 | Kocienda | 345/173 |
| 2009/0205041 | A1 * | 8/2009 | Michalske | 726/17 |
| 2011/0014955 | A1 * | 1/2011 | Kim et al. | 455/566 |

* cited by examiner

*Primary Examiner* — Xiao Wu
*Assistant Examiner* — Steven Elbinger
(74) *Attorney, Agent, or Firm* — Egan, Peterman, Enders & Huston, LLP.

(57) ABSTRACT

A computer system, portable electronic device, and method are provided for preventing accidental enabling of a disabled display and/or graphical user interface (GUI) of the display screen. The computer, device, and method hereof enable the display screen by first detecting the difference between an accidental or unintended touch on the display screen and a purposeful user interaction. An accidental touch actuation can cause a button to appear on the display, yet the display and GUI remain disabled or "locked". It is not until the user actuates the button for a predetermined amount of time will the display and GUI be restored to an enabled or "unlocked" state. If purposeful user interaction is detected, the display screen is immediately transitioned from a disabled to enabled state to quickly awaken the computer system or portable electronic device.

21 Claims, 4 Drawing Sheets

MECHANISM FOR LOCKING A COMPUTER DISPLAY AND FOR UNLOCKING THE DISPLAY WHEN PURPOSELY USED

BACKGROUND OF THE INVENTION

1. Field of the Invention

The present invention generally relates to a computer system having a display screen and a graphical user interface (GUI), and more particularly to a touch lock mechanism and method for preventing accidental enabling of a disabled display screen.

2. Description of the Related Art

The following descriptions and examples are not admitted to be prior art by virtue of their inclusion within this section.

A computer system typically involves, at a minimum, an execution engine or microprocessor, along with memory, such as semiconductor memory as well as electromagnetic memory, or hard drive memory. The execution engine can present screen information to an electronic display through a graphics card, or video driver. The electronic display may have graphical user interface (GUI) functionality which allows a user to scroll to and actuate portions of the electronic display via an input device. Those portions can be represented as icons, whereby a user activates an input device when a cursor is placed over an icon, causing the execution engine to launch various application programs, for example.

Electronic display devices are a well known computer hardware subsystem. The input devices can be any input device, such as a mouse, keyboard, pen or stylus, that allows a user to select a region on the display and, by activating the input device, cause the execution engine to execute portions of software code (e.g., executable code, or application programs).

When not in use, it is oftentimes desirable to cause the execution engine or overall computer system to enter a "sleep" state. A sleep state can comprise essentially of powering down the computer system or, in some instances, simply "blanking" the display screen. If the computer system uses a GUI, then blanking the display screen may cause non-acceptance of user-actuated input that is needed to launch a program, for example. In a computer tablet device, it is common for the display screen to blank or turn off, typically after a certain period of idle time. A display or the computer itself, including a desktop, laptop, tablet, or any device that accepts, transmits, or executes upon data, will enter the sleep state in an effort to extend useful battery life.

A significant challenge is knowing when to properly "wakeup" or turn back on a disabled display or computer so that, through the GUI, the execution engine can thereafter be triggered to execute programs. Conventional computer systems typically turn on the display, and thus the GUI functionality, whenever the input device is actuated. In the case of a mouse, for example, whenever the mouse is moved or a mouse button depressed, the electronic display will be turned on. In the case of a tablet computer, for example, the electronic display can be turned on whenever a user touches any portion of the touch-sensitive display screen (or "touch screen"). A problem occurs, however, whenever the touch screen is accidentally actuated. This problem is particularly acute for tablet computers that use touch screens, which may accidentally get "touched" multiple times throughout the day. Each time an errant or accidental touch occurs, the display screen is unintentionally enabled and all benefits of power savings are lost.

SUMMARY OF THE INVENTION

The problems outlined above are in large part solved by a computer system and method for preventing accidental enabling of a disabled display screen. The computer system described herein may take many forms including, but not limited to, a desktop computer or a portable electronic device, such as a laptop computer (or "notebook"), a tablet computer, an electronic reader, a netbook, a personal digital assistant, and a smart multi-media device.

Regardless of the type, the computer system or portable electronic device may generally include an execution engine comprising a processor, an electronic display having a display screen configurable in a disabled state and an enabled state, and a graphical user interface (GUI) that recognizes user interaction with the display screen, whether the display screen is disabled or not. When the display screen is in the enabled state (i.e., the awake state), the GUI presents at least one icon on the display screen and accepts user actuation of the at least one icon to activate the execution engine. When the display screen is in the disabled state (i.e., a sleep state), the display screen is darkened and the GUI is prevented from accepting user actuation of the at least one icon.

In addition, the computer system or portable electronic device may include a mechanism that monitors the source of the user interaction (or input) with the display screen, tracks the current state of the display screen and, specifically, determines whether the display screen is enabled (awake) or disabled (asleep). In addition, the mechanism controls a transition of the display screen, e.g., from a disabled state to an enabled state, based on the source of the input.

In a preferred embodiment, the display screen may comprise a touch-sensitive display screen (i.e., a "touch screen"), and the source of the input may be a touch or some other contact of a user's finger with the display screen (referred to as a "touch actuation"). If the source of the input is a touch actuation, the mechanism may transition the display screen from the disabled state to the enabled state in accordance with a first embodiment of the invention. For example, and as described in more detail below, the mechanism may present a user input element (e.g., a button) onto a portion of the display screen, and may transition the display screen from the disabled state to the enabled state if the button is continuously actuated for at least a predetermined amount of time.

However, the source of the input may not always be a touch actuation. In some cases, the input may come from an input device, such as a mouse, keyboard, pen or stylus, microphone, or other peripheral input device. In other cases, the input may come from the act of "tethering" the computer system or portable electronic device to a power cord or input/output cable, or the input may come from docking the portable electronic device to a docking station. Such input may be considered, by the mechanism, to comprise "intentional" interaction with the computer system or portable electronic device. If the source of the input is movement, actuation and/or contact of an input device (referred to collectively as "actuation of an input device"), or if the source of the input arises from tethering or docking the computer system or portable electronic device, the mechanism may transition the display screen from the disabled state to the enabled state in accordance with a second embodiment of the invention. Unlike the first embodiment, in which transition occurs only if a button is continuously actuated for a predetermined amount of time, the transition from the disabled state to the enabled state occurs immediately in the second embodiment upon detection an "intentional" interaction with the computer system (i.e., any interaction other than a touch actuation).

The mechanism described herein may also be referred to as a "touch lock mechanism," as it's configured to prevent only "accidental" touch events (such as may occur when a user is carrying a portable electronic device). All other input to the computer system (e.g., actuation of an input device, tethering or docking of the computer system) may cause the system to wake, if the display screen was previously disabled. In some embodiments, the touch lock mechanism itself may be enabled (turned on) or disabled (turned off). If the touch lock mechanism is disabled, any input to the computer system, including errant touches anywhere on the display screen, may cause the system to wake and the display screen to be enabled. However, it is generally preferred to enable the touch lock mechanism (at least, for example, when transporting a portable electronic device) to prevent accidental touches from enabling the display screen and possibly launching application programs the user did not intend to launch.

When the touch lock mechanism is enabled and the display screen transitions from the enabled state to the disabled state, the touch lock mechanism may reduce the active touch regions of a touch-sensitive display screen, so that only an intentional touch near the center of the display may cause the display screen to transition from off to on. Alternatively, only an intentional touch near a particular region of the display screen will cause the transition. The particular region is typically less than the display screen area, and may comprise less than 50%, 40%, 30% or 20% of the display screen area.

It is only after the display screen is touched at a particular region of the display will the disabled screen turn from the darkened display to a display showing a user-input element presented in a small portion of the darkened display screen, preferably comprising less than about 20% of the display screen surface. The user-input element that is displayed can be, for example, a button which lights only a small set of pixels on the overall display screen, with the remaining screen being black, or "blanked." The small set of pixels is preferably less than 20% of the display screen area, and more preferably less than 10%.

Once a button is presented through what might be either a purposeful or accidental touch of the display screen, a confirmation is needed to determine whether the display screen will be enabled or turned on. In other words, pressing the button does not connote turning on the display screen. It is only later, if certain activities occur that the display screen is turned on. What is meant by "enabling" or "turning on" the display is that the GUI is activated and the user can operate the computer system or portable electronic device through user actuation of icons or fields via touch or through input device(s).

Confirmation can occur by continuously actuating the button for at least a predetermined amount of time. In one example, once the button is actuated by touch, the button will be animated to provide a visual clue that the button is in the "pressed" state. It is only if the user continues to press or actuate the button for a predetermined amount of time will the display transition from a disabled state to an enabled state. The predetermined amount of time is preferably an amount of time sufficient to discern an intentional versus accidental touch, and may be, for example, 1 second, 2 seconds . . . 5 seconds, or any amount of time there between or deemed sufficient. In one embodiment, the display screen is immediately transitioned from a darkened, disabled state to a lightened, enabled state once the predetermined amount of time has been reached.

In another embodiment, the continuous actuation or depression of the button will, over time (assuming the button remains depressed) gradually increase the transparency (or gradually decrease the opacity) of the screen background to allow any active desktop applications or GUI components to show through the background once the transparency reaches 100 percent. Thus, continuation actuation of the button may cause the display screen to transition slowly from its darkened state (except for the button, which is preferably not darkened) to a lightened state while the button is being depressed, with the active desktop applications/GUI components gradually appearing on the display until the predetermined amount of time is reached. When the transparency of the darkened regions and button reaches 100%, the touch lock feature (e.g., the button) will disappear thereby allowing the user to interact with the computer applications/GUI components. If the user releases the button before the transparency reaches 100%, the display screen will return to its darkened/disabled state and the process is reset. If a touch event occurs while the display is darkened or disabled, the touch lock feature will appear but will again return to its off condition if no additional activity is detected. In this manner, the touch lock feature hereof allows only purposeful touch interactions to transition the display from off to on. Thus, the touch lock button must be depressed for a predetermined time period in order to discern whether the user intended to turn the display on or whether the touch was accidental, in which case the display will remain off.

The touch lock mechanism described above implements a unique touch-and-hold user input element to distinguish end-user intent with respect to activating the display screen. The electronic display will also respond to all device events enabled to blank the display, and further provides an optional configuration to enable a physical button to turn off the display. The electronic display will also remember the state of the touch lock mechanism prior to locking, and during the unlocking process reconfigures the device to allow all touch events to be recognized in the configured region. Thus, the display can restore the touch lock mechanism state to the end-user preferred configuration or any configuration prior to the display being turned off or disabled.

In some cases, the source of the user interaction may clearly indicate an intentional attempt to interact with the computer system or portable electronic device. For example, if the source of the user interaction is movement, actuation and/or contact of an input device (referred to collectively as "actuation of an input device"), or if the source of the input arises from tethering or docking the computer system or portable electronic device, the mechanism may consider the user interaction to be intentional, rather than accidental. When intentional interaction is detected in the second embodiment of the invention, the mechanism will bypass the touch lock mechanism described above and immediately transition the display screen from the disabled state to the enabled state. This provides the advantage of quickly enabling or unlocking the computer system or portable electronic device in response to intentional interaction.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
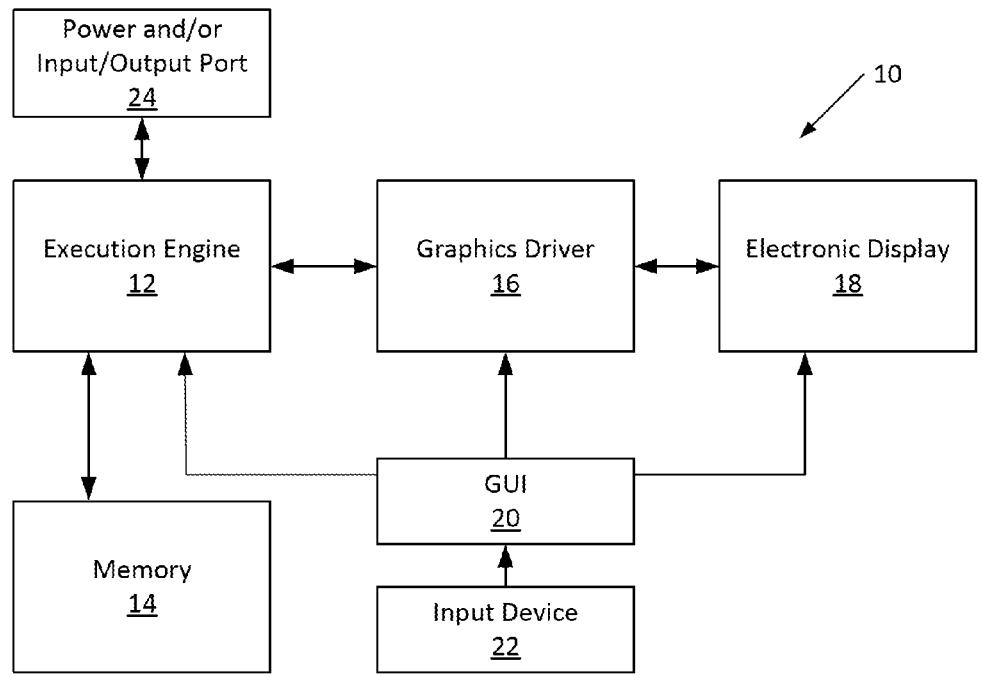
FIG. 1 a block diagram of a computer system having an electronic display.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates a computer system 10 having an execution engine 12, a memory 14, a graphics driver 16, and an electronic display 18. Of course, there can be numerous other subsystems associated with a computer system; however, for purposes of subsequent explanation and brevity, the rudimentary subsystems shown are adequate. Along with the components mentioned above, one or more input device(s) 20 may be used, along with a graphical user interface (GUI) 22 and the electronic display 18 to provide user input to the computer system. Input to the computer system may also come from a power or input/output port 24 coupled to the computer system for connecting the computer system to a power cord, an input/output cable or a docking station.

The input device 20 can be any device that moves and actuates a cursor across a display screen of the electronic display 18. Examples of input device 20 include, but are not limited to, a mouse, a keyboard, a stylus or "pen", a microphone and other peripheral input devices. The electronic display 18 preferably includes a touch-sensitive display screen. The GUI 22, when presented on the display screen, can have regions that are designated with certain icons or user applications that, through activation of the input device 20 or a user's finger, causes those applications to be launched and executed upon by the execution engine 12.

Computer 10 includes any computing or electronic device which has an execution engine and a display, as well as the other features shown in FIG. 1. For example, computer 10 can be a tablet computer, a personal computer (either desktop or laptop), an electronic reader, a netbook, a personal digital assistant (PDA), a smart mobile device, etc. Input device 20 may include any device which can be actuated by a user, and when actuated, a feature illustrated on display 18 can be selected or an area written to. The selected region can be an icon or field, as shown in FIG. 2.

Figure 2:
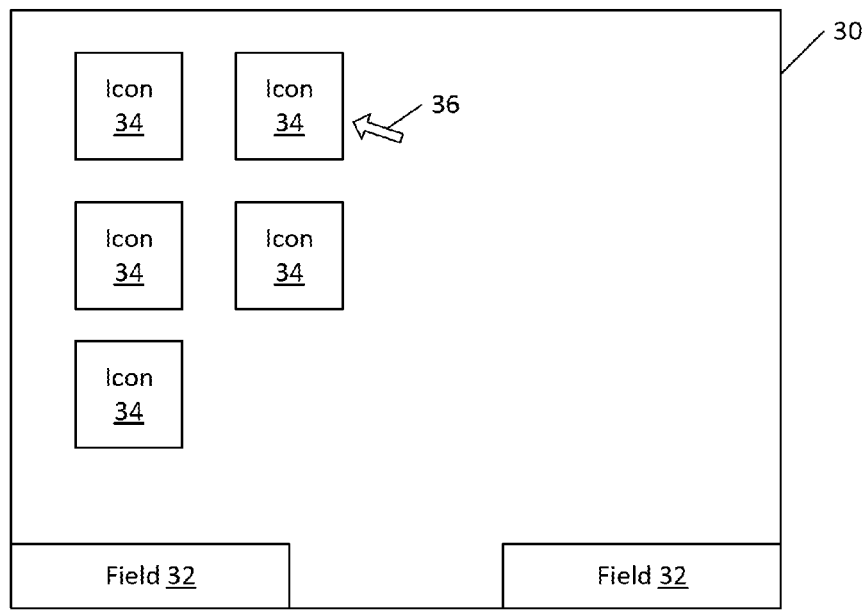
FIG. 2 is a plan diagram of an enabled electronic display.

FIG. 2 illustrates one example of a screen shot 30 presented on display 18. Screen shot 30 can be a "home" screen, such as that presented by the Windows® operating system environment, or any other screen configured to accept user input. In some embodiments, there may be certain fields 32 presented at the bottom or top of screen 30, and those fields can be pull-down fields, for example, for user selection and actuation. In some embodiments, there may also be one or more icons 34, and each icon 34 can represent an application program, for example. By moving cursor 36 via input device 20 or a user's finger, cursor 36 can be placed over an icon 34 and, by actuating input device 20 or touching the screen, the application program corresponding to that icon can be launched. Because the icons 34 and pull-down menus 32 can be selected and manipulated through user actuation, screen 30 is said to be an active or enabled display screen. As set out in more detail below, if display screen 18 is turned off or disabled, the mechanism used to turn on, enable, or activate display 18 is one that occurs not by accident or unintentionally, but through purposeful actions by the user.

Figure 3:
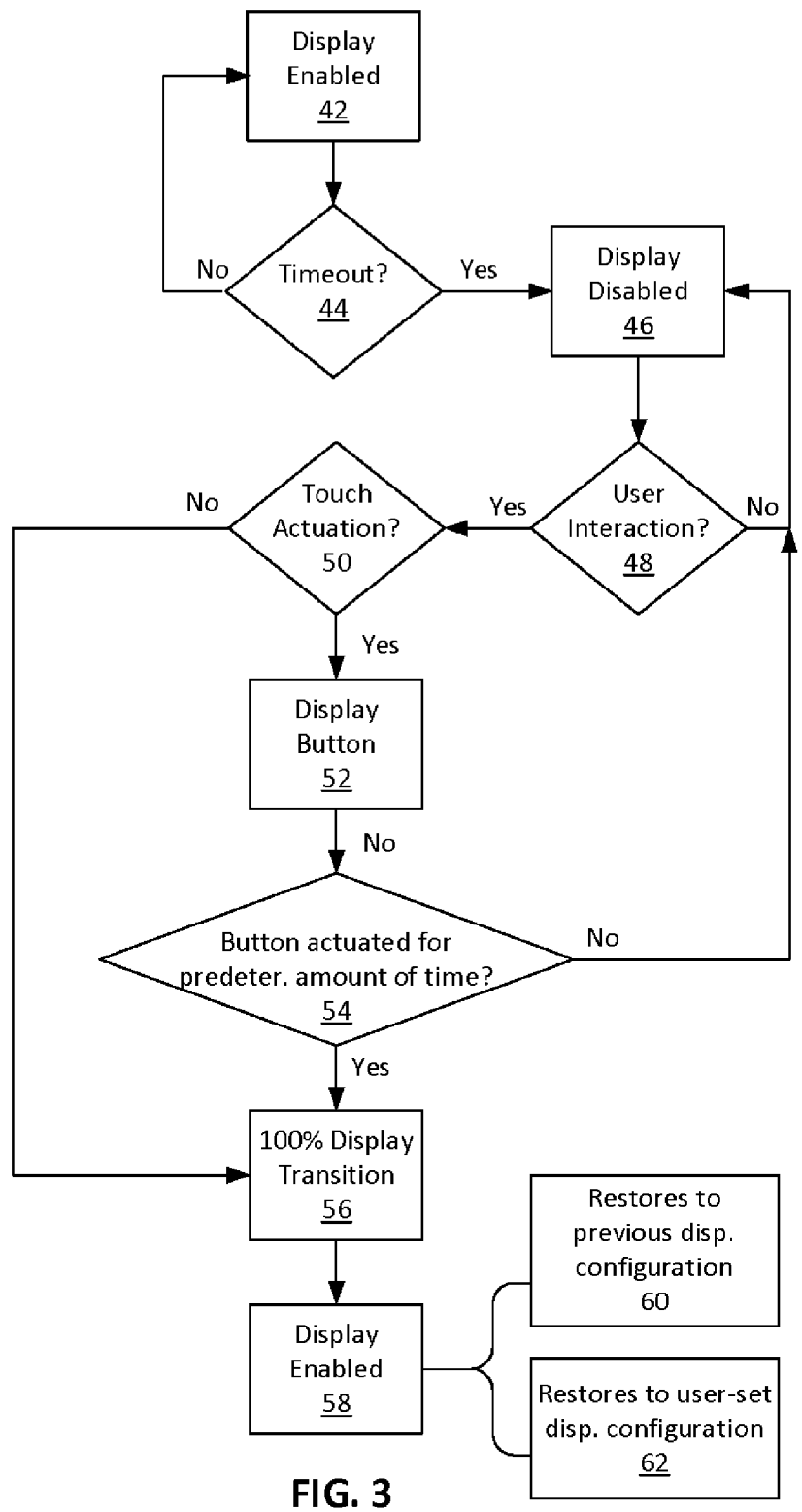
FIG. 3 is a flow diagram of steps used to disable the display, and thereafter, prevent accidental enabling of the disabled display.

Turning to FIG. 3, flow diagram 40 illustrates exemplary steps that may be used, in one embodiment, to disable the display screen and thereafter prevent accidental enabling of the disabled display. Flow diagram 40 begins with the display enabled (in step 42), wherein an enabled display means, e.g., that icons 34 and fields 32 are accessible for user actuation. If no activity occurs, e.g., no user interaction with the enabled display and/or no user interaction with the input device(s), for a specific timeout period (in step 44), then the display will be disabled (in step 46). In some embodiments, the display may be disabled in response to other actions, such as pressing a physical button on the computer system housing, wherein said button has been programmed to enable/disable the display screen. When the display screen is locked, the graphical user interface (GUI) will be disabled, and the display will go dark, such that the icons 34 and fields 32 are no longer accessible for user actuation. In this condition, the computer enters a "sleep state" thereby powering down certain subsystems in order to conserve battery power to the computer.

In one embodiment, the display screen may be darkened in the disabled state by displaying a dark background over the GUI. In another embodiment, the display screen may be darkened by deactivating a backlight of the display screen. In either embodiment, the icons 34 and fields 32 of the GUI are obscured from view, and the GUI is further prevented from accepting user actuation of the icons and fields should any accidentally occur.

The display off condition (step 46) will remain until the mechanism detects user interaction with the computer (in step 48) and determines that such user interaction is intentional. User interaction may comprise movement, actuation and/or contact of an input device (e.g., a mouse, pen/stylus, keyboard, etc.) in any fashion, a user touching the touch-sensitive display screen in a particular region of the display screen, a user plugging in or "tethering" the computer system to a power cord or input/output cable, or a user docking the computer system with a docking station. If user interaction is detected (in step 48), the mechanism determines whether the user interaction comprises a touch actuation (which may be intentional or accidental) or any other input exclusive of touch (in step 50).

Touch actuation may include both inadvertent and intentional contact of a user's finger(s) with the touch-sensitive display screen. If touch actuation is detected in the particular region of the display screen (in step 50), additional steps are taken by the mechanism to determine if the touch actuation is inadvertent (in which case the display screen would remain disabled) or intentional (in which case the display screen would become enabled). As set forth in more detail below, the mechanism considers any an input other than a touch actuation to be an intentional attempt made by a user to interact with the computer. If any input other than touch is detected (in step 50), one or more of the additional steps mentioned above and discussed below (e.g., steps 52 and 54) may be bypassed to automatically transition the display screen from its disabled to enabled state.

In some embodiments, a display button will appear on the disabled display screen (in step 52) if the mechanism determines that a user has touched a particular region of the touch-sensitive screen (in step 50). Although not limited to such placement, the particular region may be approximately in the center of the display screen, and may typically comprise 50% or less of the total screen area. In other embodiments, the user may touch possibly any portion of the touch-sensitive screen to cause the button to appear. The display button can be presented as a small group of pixels being illuminated different from the remaining screen. In one example, the remaining screen may be darkened or black, and the small group of pixels may comprise any shade, which distinguishes the small group of pixels from the remaining screen. Such pixels preferably comprise less than 20%, and more preferably, less than 10%, of the overall display region. The appearance of the display button does not allow the user access to icons 34 or other fields 32 on the disabled display screen. However, if the user continues to actuate the display button for a predetermined amount of time (in step 54), then the display will transition (in step 56) from its disabled state to its enabled state (in step 56). The predetermined amount of time is preferably an amount of time sufficient to discern an intentional versus accidental touch, and may be, for example, 1 second, 2 seconds . . . 5 seconds, or any amount of time there between or deemed sufficient. If the button is not actuated for the predetermined amount of time, the display remains in the disabled state (No branch of step 54 back to step 46).

In some embodiments, the transition from the disabled state to the enabled state may be substantially instantaneous (at least as perceived by the user), after the button has been continuously depressed for the predetermined amount of time. In other embodiments, the continued actuation of the button will cause a gradual lightening of the darkened display screen and a corresponding gradual reappearance of the underlying GUI screen. In one embodiment, the display screen may be gradually lightened by gradually increasing a transparency, or decreasing an opacity, of the dark background displayed over the GUI in the disabled state. In one embodiment, the backlight of the display screen may be deactivated in the disabled state and activated in the enabled state. Regardless, the icons and other fields will be accessible to the user only after the display screen has been fully transitioned to the enabled state. If the button is not continuously actuated for the entire predetermined amount of time (in step 54), the display may instantaneously or gradually fade to black when reverting back to the disabled state.

In some embodiments, other input may be detected by the mechanism instead of a touch actuation (NO branch of step 50). Examples of other input that may be detected by the mechanism may include, but are not limited to, actuation of an input device, and connection of the computer system to a power cord, input/output cable or docking station. Actuation of an input device may include, but is not limited to, movement of a mouse or actuation of a mouse or keyboard operationally attached to the computer system, actuation of a physical button (such as a power button or home button) on the computer chassis, or actuation of a stylus/pen and/or contact of the stylus/pen with the display screen. When an input device is actuated or used to contact the display screen, or when the computer system is tethered or docked, the mechanism assumes that such interaction is an intentional attempt made by a user to interact with the computer system. If intentional interaction is detected (in steps 48 and 50), steps 52 and 54 may be bypassed to automatically transition the display screen from its disabled to enabled state (in step 56). In most cases, this transition may be substantially instantaneous (as perceived by the user), so that the user does not have to wait for the transition to occur. Automatically transitioning the display screen from "off" to "on" in response to intentional user interaction may be desired as it enables the computer system to be "awakened" quickly in response to intentional user interaction.

When the display screen is returned to its enabled state (in step 58), the display screen can be restored to its previous display configuration (in step 60), or to a user-set configuration (in step 62). The user-set configuration can be a default configuration, for example.

Figure 4:
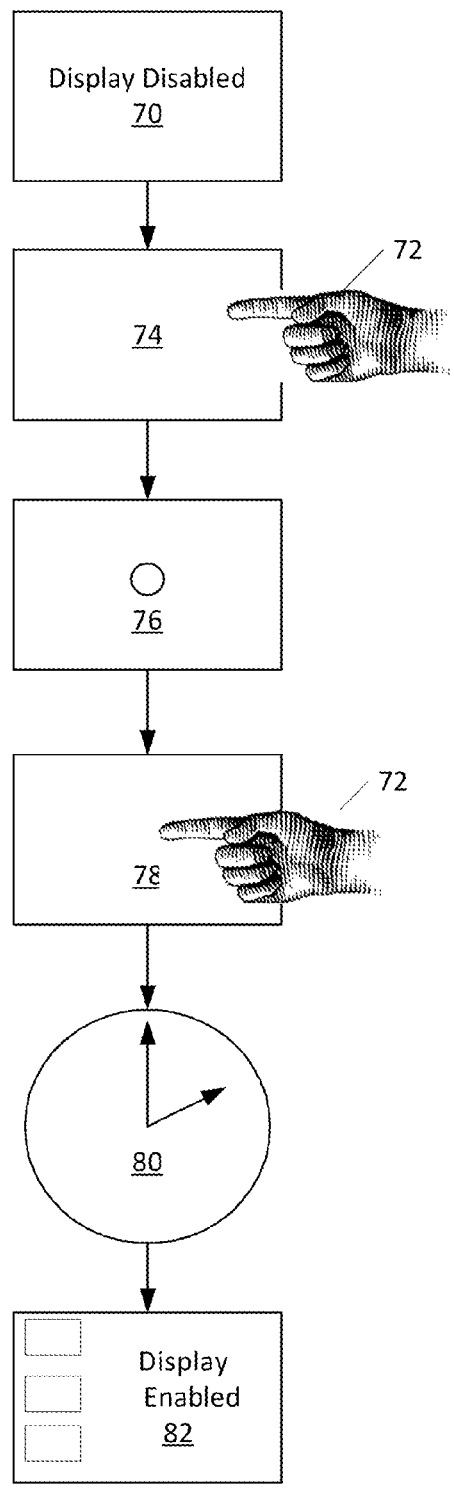
FIG. 4 is a plan diagram of multiple display screens drawn in sequence to illustrate a display screen transitioning from a disabled state to an enabled state in response to an intentional touch actuation.

FIG. 4 illustrates a plan diagram of multiple display screens drawn in sequence to illustrate a display screen transitioning from a disabled state to an enabled state, in accordance with one embodiment of the invention. In particular, FIG. 4 illustrates the embodiment in which the display screen transitions from a disabled to enabled state in response to an intentional touch actuation. The illustrated embodiment begins with the display screen in a disabled state 70. As noted above, there may be numerous actions or inactions that may cause the display screen to be disabled. These may include, but are not limited to, a length of inactivity corresponding to a time-out setting, actuation of a physical button on the computer chassis or actuation of a field or icon presented on the display screen, wherein said actuation is configured to place the system in a sleep state. When disabled, the display screen is darkened and the underlying GUI is disabled, so that the icons and other fields presented on the display screen (shown in FIG. 2) are not accessible to the user.

As shown in FIG. 4, contact of a user's finger 72 with the disabled display 74 causes a display button to appear somewhere on the disabled display screen 76. Although display screen 76 shows the display button in the center of the screen, it is not limited to such placement, and may be positioned substantially anywhere on the disabled display screen. However, it is generally desired for the display button to cover less than 20% and more preferably, less than 10%, of the overall display region. If the display button is actuated 78 for the predetermined amount of time 80, the display screen is transitioned to its enabled state 82.

In some embodiments, the display screen may gradually transition from its disabled to enabled state, while the button is being continuously actuated 78, with 100% transition occurring only after elapse of the predetermined amount of time 80. Gradual transition may be achieved by gradually decreasing the opacity of the darkened display screen, so that the underlying graphical user interface (GUI) components gradually come into view. In other embodiments, the transition may be substantially instantaneous (as perceived by the user) at the end of the predetermined amount of time 80. When enabled, the display screen and underlying GUI are fully enabled, such that the icons or other fields, e.g., fields 32 and icons 34 (FIG. 2), can be activated to launch application programs or perform other tasks.

Figure 5:
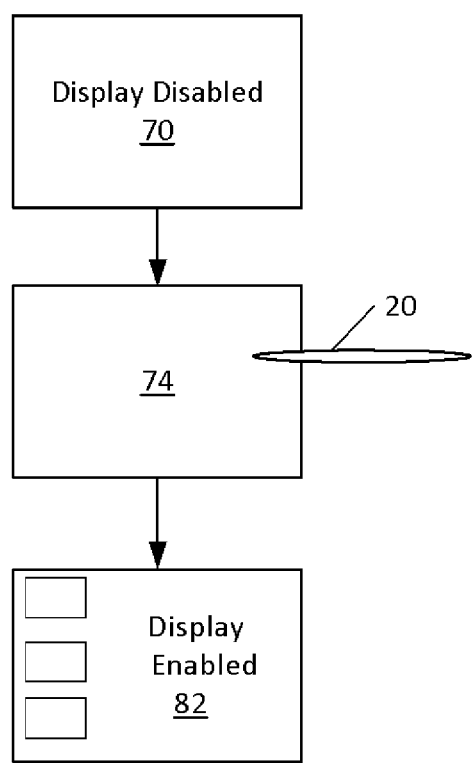
FIG. 5 is a plan diagram of multiple display screens drawn in sequence to illustrate a display transitioning from a disabled state to an enabled state in response to actuation of an input device.

FIG. 5 illustrates a plan diagram of multiple display screens drawn in sequence to illustrate a display transitioning from a disabled to enabled state, in accordance with another embodiment of the invention. In particular, FIG. 5 illustrates the embodiment in which the display screen transitions from a disabled to enabled state in response to any input other than touch. As before, the illustrated embodiment begins with the display screen in a disabled state 70. As noted above, there may be numerous actions or inactions that may cause the display screen to turn off. When disabled, the display screen is darkened and the underlying GUI is disabled, so that the icons and other fields (shown in FIG. 2) are not accessible to the user.

In the embodiment of FIG. 5, actuation of an input device 74 may cause the display screen to automatically transition from its disabled state 70 to its enabled state 82. Examples of input device actuation include, but are not limited to, movement of an input device 20, actuation of an input device 20, and/or contact between the input device 20 and the display screen. When an input device 20 is moved, actuated and/or used to contact the display screen, the mechanism assumes that such interaction is an intentional attempt made by a user to interact with the computer system and automatically transitions the display screen from its disabled state 70 to its enabled state 82. Although not shown in FIG. 5, the display screen may also be transitioned automatically from its disabled state 70 to its enabled state 82 in response to input received from an input/output port (24, FIG. 1) of the computer system. Such input may be received, for example, when the computer system is connected to a power cord, input/output cable or docking station. When enabled, the display screen and underlying GUI are fully enabled, such that the icons or other fields, e.g., fields 32 and icons 34 (FIG. 2), can be activated to launch application programs or perform other tasks.

In most cases, the transition between the disabled state 70 and the enabled state 82 will be substantially instantaneous (as perceived by the user) in the embodiment of FIG. 5, so that the user does not have to wait for the transition to occur. As noted above, automatically transitioning the display screen from "off" to "on" in response to any input other than touch enables the computer system to be "awakened" quickly in response to "intentional" user interaction.

The invention as described herein provides a mechanism, which monitors and detects a source of user interaction with a disabled display screen and controls a transition of the display screen from a disabled state to an enabled state based on the detected source.

In one embodiment, the mechanism comprises a touch lock mechanism, which is coupled to the display screen for presenting a button onto a portion of the display screen in response to a touch actuation on the display screen when the display screen is in the disabled state. If the touch lock mechanism recognizes continuous user actuation onto only the button beyond a predetermined amount of time, the touch lock mechanism is configured to transition the display screen from the disabled state to the enabled state. As noted above, the transition may be gradual or substantially instantaneous, once the predetermined amount of time is reached. If the user actuation is not continuously maintained on the button for the entire predetermined amount of time, the touch lock mechanism is configured to leave the display screen in its disabled state, or revert the display screen back to the disabled state if gradual transition to the enabled state has occurred. The touch lock mechanism described herein may be implemented in hardware, software, or any combination thereof.

In one embodiment, the touch lock mechanism is implemented with program instructions, which may be stored within memory 14 (FIG. 1) and executed by a processor within execution engine 12 (FIG. 1). In such an embodiment, the touch lock mechanism may comprise a first set of instructions executable for presenting a button onto a portion of the display screen in response to a touch actuation (FIGS. 3 and 4), a second set of instructions executable for activating a timer to determine a length of time continuous user actuation is maintained on the button (FIGS. 3 and 4), and a third set of instructions executable for transitioning the display screen from the disabled state to the enabled state only if the length of time reaches a predetermined amount of time (FIGS. 3 and 4).

In addition, the mechanism described herein may also include a bypass mechanism, which is coupled to the display screen for bypassing the touch lock mechanism and immediately transitioning the display screen from the disabled state to the enabled state in response to any input other than touch. The bypass mechanism described herein may be implemented in hardware, software, or any combination thereof.

In one embodiment, the bypass mechanism is implemented with program instructions, which may be stored within memory 14 (FIG. 1) and executed by a processor within execution engine 12 (FIG. 1). In such an embodiment, the bypass mechanism may comprise a first set of instructions executable for detecting any input to the computer other than touch (FIGS. 3 and 5), and a second set of instructions executable for immediately transitioning the display screen from the disabled state to the enabled state in response to such input (FIGS. 3 and 5).

The invention as described herein also provides a method for enabling a disabled display screen of a computer system or portable electronic device, wherein when disabled, the display screen presents a dark background on the display screen and prevents a graphical user interface of the computer system or portable electronic device from accepting user actuation of one or more icons, which are presented on the display screen when the display screen is in an enabled state.

According to one embodiment, the method comprises detecting user interaction with the computer system or display screen when the display screen is in the disabled state (step 48, FIG. 3), determining a source of the user interaction (step 50, FIG. 3), and controlling a transition of the display screen from the disabled state to an enabled state based on said source (steps 50-56, FIG. 3). If the method determines that the source of the user interaction comprises any input to the computer system other than touch (No branch of step 50, FIG. 3), the method responds by immediately transitioning the display screen from the disabled state to the enabled state (step 56, FIG. 3). However, if the method determines that the source of the user interaction comprises a touch actuation on the display screen (Yes branch of step 50, FIG. 3), additional steps may be taken by the method to determine if the touch actuation was intentional or accidental.

For example, the additional steps may include displaying a button onto a portion of the display screen (step 52, FIG. 3; display screen 76, FIG. 4), detecting user actuation of only the portion of the display screen displaying the button (display screen 78, FIG. 4), and activating a timer to determine a length of time the user actuation is continuously maintained on the button (step 54, FIG. 3; timer 80, FIG. 4). In this embodiment, the method further includes transitioning the display screen from the disabled state to the enabled state if the length of time reaches a predetermined amount of time (YES branch of step 54 to 56, FIG. 3; display screen 82, FIG. 4), or leaving the display screen in the disabled state if the length of time does not reach the predetermined amount of time (NO branch of step 54 back to step 46, FIG. 3).

As noted above, the step of transitioning may include gradually transitioning the display screen from the disabled state to the enabled state, in one embodiment of the invention. Such transition may involve gradually decreasing an opacity of a dark background overlying a graphical user interface (GUI) screen, to gradually bring the GUI into view until the length of time reaches the predetermined amount of time, at which time the method may fully transition the display screen to the enabled state. If the length of time does not reach the predetermined amount of time, the method may revert or transition the display screen back to the disabled state, thereby locking the display against unintentional touch.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer, comprising:
   an execution engine;
   an electronic display coupled to the execution engine and having a touch-sensitive display screen configurable in a locked state and an unlocked state;
   a graphical user interface (GUI) coupled to the execution engine and the electronic display, wherein the GUI presents at least one icon on the display screen and accepts user actuation of the at least one icon to launch the execution engine only when the display screen is in the unlocked state; and
   a mechanism coupled to the execution engine and the electronic display and configured for determining a source of user interaction with the computer or the locked display screen and controlling a transition of the display screen from the locked state to the unlocked state based on said source, wherein said mechanism comprises:
      a touch lock mechanism configured for presenting a button onto a portion of the locked display screen if the source of the user interaction is determined to be a touch actuation on the locked display screen, and transitioning the display screen from the locked state to the unlocked state only if the button is continuously actuated for a predetermined amount of time; and
      a bypass mechanism configured for bypassing the presentation of the button onto the portion of the locked display screen and immediately transitioning the display screen from the locked state to the unlocked state upon connection of the computer to a power cord.

2. The computer as recited in claim 1, wherein the bypass mechanism is further configured for bypassing the presentation of the button onto the portion of the locked display screen and immediately transitioning the display screen from the locked state to the unlocked state upon actuation of an input device connected to the computer, actuation of a physical button on a chassis of the computer, actuation or contact of a stylus with the display screen, connection of the computer to a docking station or connection of the computer to an input/output cord.

3. The computer as recited in claim 1, wherein when the mechanism is enabled and the display screen is locked, the mechanism reduces an active touch area of the touch-sensitive display screen to about 50% or less of the total touch-sensitive area of the display screen.

4. The computer as recited in claim 3, wherein a touch on the display screen outside of the active touch area is not detected by the mechanism when the mechanism is enabled and the display screen is locked.

5. The computer as recited in claim 1, wherein the display screen is darkened and the graphical user interface is prevented from accepting user actuation of the at least one icon when the display screen is in the locked state.

6. The computer as recited in claim 1, wherein if the mechanism determines the source of the user interaction comprises a touch actuation on the locked display screen, the touch lock mechanism is configured to:
   present the button onto the portion of the locked display screen; and
   activate a timer coupled to the graphical user interface to determine a length of time user actuation is maintained on the button;
   wherein if the length of time reaches the predetermined amount of time, the touch lock mechanism is further configured to transition the display screen from the locked state to the unlocked state.

7. The computer as recited in claim 6, wherein if the length of time does not reach the predetermined amount of time, the touch lock mechanism is further configured to leave the display screen in the locked state.

8. The computer as recited in claim 6, wherein while the user actuation is maintained on the button, the touch lock mechanism is configured to gradually transition the display screen from the locked state to the unlocked state, and wherein the mechanism is further configured to fully transition the display screen to the unlocked state if the length of time reaches the predetermined amount of time, else the mechanism is further configured to transition the display screen back to the locked state.

9. The computer as recited in claim 6, wherein the button is presented in less than twenty percent of the display screen area.

10. A portable electronic device, comprising:
    a display screen configurable in a locked state and an unlocked state;
    a graphical user interface (GUI) that presents at least one icon on the display screen and accepts user actuation of the at least one icon only when the display screen is in the unlocked state, and wherein the display screen is darkened and the GUI is prevented from accepting user actuation of the at least one icon when the display screen is in the locked state;
    a touch lock mechanism coupled to the display screen for presenting a button onto a portion of the display screen in response to a touch actuation on the display screen when the display screen is in the locked state, wherein if the touch lock mechanism recognizes continuous user actuation onto only the button beyond a predetermined amount of time, the touch lock mechanism is configured to transition the display screen from the locked state to the unlocked state; and a bypass mechanism coupled to the display screen for bypassing the presentation of the button onto the portion of the locked display screen and immediately transitioning the display screen from the locked state to the unlocked state upon connection of the portable electronic device to a power cord.

11. The portable electronic device recited in claim 10, wherein the touch lock mechanism comprises a first plurality of instructions stored within a memory of the portable electronic device and executable by a processor of the portable electronic device, and wherein the first plurality of instructions comprise:
 a first set of instructions executable for presenting the button onto the portion of the display screen in response to the touch actuation;
 a second set of instructions executable for activating a timer to determine a length of time the continuous user actuation is maintained on the button; and
 a third set of instructions executable for transitioning the display screen from the locked state to the unlocked state only if the length of time reaches a predetermined amount of time.

12. The portable electronic device as recited in claim 11, wherein the third set of instructions comprise instructions for gradually transitioning the display screen from the locked state to the unlocked state, wherein the display screen is fully enabled only if the length of time reaches the predetermined amount of time, else the display screen is reverted back to the locked state.

13. The portable electronic device recited in claim 12, wherein the display screen is darkened in the locked state by displaying a dark background over the GUI, and wherein the instructions for gradually transitioning the display screen from the locked state to the unlocked state comprise instructions for gradually decreasing an opacity of the dark background to gradually bring the GUI into view.

14. The portable electronic device recited in claim 13, wherein the display screen is further darkened in the locked state by deactivating a backlight of the display screen, and wherein the instructions for gradually transitioning the display screen from the locked state to the unlocked state comprise instructions for activating the backlight.

15. The portable electronic device recited in claim 10, wherein the bypass mechanism comprises a second plurality of instructions stored within a memory of the portable electronic device and executable by a processor of the portable electronic device, and wherein the second plurality of instructions comprise:
 a first set of instructions executable for detecting any intentional input to the portable electronic device other than a touch actuation on the display screen; and
 a second set of instructions executable for immediately transitioning the display screen from the locked state to the unlocked state in response to said any intentional input.

16. The portable electronic device recited in claim 15, wherein the first set of instructions is executable for detecting any intentional input from a group consisting of: actuation of an input device connected to the portable electronic device, actuation of a physical button on a chassis of the portable electronic device, actuation or contact of a stylus with the display screen, connection of the portable electronic device to a power cord, connection of the portable electronic device to an input/output cord, and connection of the portable electronic device to a docking station.

17. A method for unlocking a display screen of a portable electronic device, the display screen being in a locked state, which presents a dark background on the display screen and prevents a graphical user interface of the portable electronic device from accepting user actuation of one or more icons, which are presented on the display screen when the display screen is in an unlocked state, the method comprising:
 detecting user interaction with the portable electronic device or the display screen when the display screen is in the locked state;
 determining a source of the user interaction, wherein if the source of the user interaction is determined to be a touch actuation on the display screen, the method further comprises:
 presenting a button onto a portion of the locked display screen;
 transitioning the display screen from the locked state to the unlocked state only if the button is continuously actuated for a predetermined amount of time; and
 bypassing the presentation of the button onto the portion of the disabled display screen and immediately transitioning the display screen from the locked state to the unlocked state upon connection of the portable electronic device to a power cord.

18. The method as recited in claim 17, wherein if the source of the user interaction is determined to be a touch actuation on the display screen, the method further comprises:
 detecting user actuation of only the portion of the display screen displaying the button;
 activating a timer to determine a length of time the user actuation is continuously maintained on the button, wherein the method further comprises:
 transitioning the display screen from the locked state to the unlocked state if the length of time reaches a predetermined amount of time; and
 leaving the display screen in the locked state if the length of time does not reach the predetermined amount of time.

19. The method as recited in claim 18, wherein the step of transitioning comprises gradually transitioning the display screen from the locked state to the unlocked state and gradually decreasing an opacity of the dark background to gradually bring the graphical user interface into view until the length of time reaches the predetermined amount of time, at which time the method further comprises fully transitioning the display screen to the unlocked state.

20. The method as recited in claim 19, wherein if the length of time does not reach the predetermined amount of time, the method further comprises reverting the display screen back to the locked state.

21. The method as recited in claim 17, wherein the step of bypassing the presentation of the button onto the portion of the disabled display screen and immediately transitioning the display screen from the locked state to the unlocked state is further performed upon actuation of an input device connected to the computer, actuation of a physical button on a chassis of the computer, actuation or contact of a stylus with the display screen, connection of the computer to a docking station or connection of the computer to an input/output cord.

* * * * *